US012058631B2

(12) United States Patent
Gulati et al.

(10) Patent No.: US 12,058,631 B2
(45) Date of Patent: Aug. 6, 2024

(54) RESOURCE SELECTION AND ON-DEMAND REQUEST FOR SIDELINK SYNCHRONIZATION SIGNALS

(71) Applicant: QUALCOMM Incorporated, San Diego, CA (US)

(72) Inventors: Kapil Gulati, Hillsborough, NJ (US); Wanshi Chen, San Diego, CA (US); Junyi Li, Chester, NJ (US); Tao Luo, San Diego, CA (US); Sony Akkarakaran, Poway, CA (US); Jung Ho Ryu, Fort Lee, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/994,141

(22) Filed: Aug. 14, 2020

(65) Prior Publication Data

US 2021/0051614 A1 Feb. 18, 2021

Related U.S. Application Data

(60) Provisional application No. 62/887,455, filed on Aug. 15, 2019.

(51) Int. Cl.
| | |
|---|---|
| *H04W 24/02* | (2009.01) |
| *H04L 1/08* | (2006.01) |
| *H04L 5/00* | (2006.01) |
| *H04W 56/00* | (2009.01) |
| *H04W 72/02* | (2009.01) |
| *H04W 72/20* | (2023.01) |

(Continued)

(52) U.S. Cl.
CPC ............. *H04W 56/001* (2013.01); *H04L 1/08* (2013.01); *H04W 72/02* (2013.01); *H04W 72/20* (2023.01); *H04W 72/541* (2023.01); *H04W 92/18* (2013.01)

(58) Field of Classification Search
CPC .......... H04W 56/001; H04W 56/0015; H04W 56/002; H04W 72/02; H04W 72/0406; H04W 72/082; H04W 76/14; H04W 92/18; H04L 1/08; H04L 5/0053; H04L 5/0091
See application file for complete search history.

(56) References Cited

U.S. PATENT DOCUMENTS 10,334,644 B2 * 6/2019 Yoon ..................... H04W 8/005
10,356,733 B2 * 7/2019 Gupta ............... H04W 74/0891
(Continued)

OTHER PUBLICATIONS

Partial International Search Report—PCT/US2020/046610—ISA/EPO—Nov. 17, 2020.
(Continued)

*Primary Examiner* — Sithu Ko
(74) *Attorney, Agent, or Firm* — Thien T. Nguyen

(57) ABSTRACT

In an embodiment, a UE identifies a pool of resources where transmission of sidelink synchronization signals is permitted, the pool of resources including at least UE-specific resources, and transmits a sidelink synchronization signal to one or more peer sidelink UEs based on a subset of the pool of resources. In another embodiment, a UE transmits a synchronization request message to at least one peer sidelink UE, and receives at least one sidelink synchronization signal from the at least one peer sidelink UE in response to the transmission of the synchronization request message.

46 Claims, 12 Drawing Sheets

(51) Int. Cl.
*H04W 72/541* (2023.01)
*H04W 92/18* (2009.01)

(56) References Cited

U.S. PATENT DOCUMENTS

| | | | | |
|---|---|---|---|---|
| 10,390,319 | B2* | 8/2019 | Kalhan | H04W 28/16 |
| 11,109,334 | B2* | 8/2021 | Khoryaev | H04L 5/0091 |
| 11,140,663 | B2* | 10/2021 | Lee | H04W 72/02 |
| 11,317,415 | B2* | 4/2022 | Khoryaev | H04W 72/51 |
| 11,483,782 | B2* | 10/2022 | Cheng | H04L 5/0092 |
| 11,589,349 | B2* | 2/2023 | Park | H04L 1/1812 |
| 11,876,624 | B2* | 1/2024 | Kim | H04L 1/1887 |
| 2015/0117375 | A1* | 4/2015 | Sartori | H04W 56/002 370/329 |
| 2015/0245334 | A1* | 8/2015 | Chang | H04W 72/02 370/329 |
| 2015/0264588 | A1* | 9/2015 | Li | H04W 56/002 370/350 |
| 2015/0327201 | A1* | 11/2015 | He | H04W 8/005 370/336 |
| 2016/0044619 | A1* | 2/2016 | Ryu | H04W 72/0446 370/350 |
| 2016/0135240 | A1* | 5/2016 | Yoon | H04W 8/005 370/329 |
| 2016/0204885 | A1* | 7/2016 | Sorrentino | H04B 17/318 455/67.11 |
| 2016/0205644 | A1* | 7/2016 | Seo | H04L 27/2613 370/350 |
| 2017/0188320 | A1* | 6/2017 | Xiong | H04W 72/044 |
| 2017/0208636 | A1 | 7/2017 | Agiwal et al. | |
| 2017/0215119 | A1* | 7/2017 | Hong | H04W 36/0072 |
| 2018/0048986 | A1 | 2/2018 | Adachi et al. | |
| 2018/0049053 | A1* | 2/2018 | Kaikkonen | H04W 24/10 |
| 2018/0070264 | A1* | 3/2018 | Saiwai | H04W 72/04 |
| 2018/0077746 | A1* | 3/2018 | Lee | H04W 72/08 |
| 2019/0028947 | A1 | 1/2019 | Adachi | |
| 2019/0045345 | A1* | 2/2019 | Lee | H04W 4/06 |
| 2020/0196255 | A1* | 6/2020 | Cheng | H04L 5/0064 |
| 2021/0007082 | A1* | 1/2021 | Akkarakaran | H04W 72/04 |
| 2021/0051614 | A1* | 2/2021 | Gulati | H04W 72/02 |
| 2021/0051617 | A1* | 2/2021 | Gulati | H04W 56/0025 |
| 2021/0168814 | A1* | 6/2021 | Chen | H04W 72/0493 |
| 2021/0289474 | A1* | 9/2021 | Wang | H04W 56/001 |
| 2021/0345313 | A1* | 11/2021 | Basu Mallick | H04W 72/0406 |
| 2021/0352599 | A1* | 11/2021 | Kusashima | H04W 76/14 |

OTHER PUBLICATIONS

Taiwan Search Report—TW109127970—TIPO—Dec. 8, 2023.
Intel Corp: "Synchronization Design for NR V2X Sidelink Communication",3GPP Draft, 3GPP TSG RAN WG1 Mtg #97,R1-1906797 INTEL-EV2X SLSYNC, 3rd Generation Partnership Project (3GPP), Mobile Competence Centre,650,Route Des Lucioles,F-06921,Sophia-Antipolis Cedex,FR,vol. RAN WG1.No.Reno, USA, May 13, 2019-May 17, 2019, May 13, 2019(May 13, 2019)XP051708833,pp. 1-17, Retrieved from Internet:URL:http://www.3gpp.org/ftp/Meetings%5F3GPP%5FSYNC/RAN1/Docs/R1%2D1906797%2Ezip [retrieved May 13, 2019]Proposal 12; section 2.2.1. 2.2.7; Figure 2. 5.
International Search Report and Written Opinion—PCT/US2020/046610—ISA/EPO—Feb. 22, 2021.
NEC: "D2D Synchronization Procedure for Out-of-Network Coverage", 3GPP TSG RAN WG1 Meeting #79; R1-144858; 3rd Generation Partnership Project (3GPP), Mobile Competence Centre; 650, Route Des Lucioles; F-06921 Sophia Antipolis Cedex; France, vol. RAN WG1, No. San Francisco, USA; Nov. 17, 2014-Nov. 21, 2014, Nov. 17, 2014 (Nov. 17, 2014), 4 Pages, XP050875920, Retrieved from the Internet: URL: http://www.3gpp.org/ftp/tsg_ran/WG1_RL1/TSGR1_79/Docs/R1-144858.zip [retrieved on Nov. 17, 2014].
Qualcomm Incorporated: "Overview of Latest RAN1/2 Agreements", 3GPP Draft, 3GPP TSG-RAN WG4 #74, R4-150205, 3rd Generation Partnership Project (3GPP), Mobile Competence Centre, 650, Route Des Lucioles, F-06921 Sophia-Antipolis Cedex, France, vol. RAN WG4, No. Athens, Greece, Feb 9, 2015-Feb. 13, 2015, Feb. 8, 2015 (Feb. 8, 2015), XP050937698, 5 Pages, Retrieved from the Internet: URL: http://www.3gpp.org/ftp/Meetings_3GPP_SYNC/RAN4/Docs/. [retrieved on Feb. 8, 2015] p. 2. penultimate bullet point, figure 3.

* cited by examiner

RESOURCE SELECTION AND ON-DEMAND REQUEST FOR SIDELINK SYNCHRONIZATION SIGNALS

CROSS-REFERENCE TO RELATED APPLICATION

The present Application for Patent claims the benefit of U.S. Provisional Application No. 62/887,455, entitled "RESOURCE SELECTION FOR SIDELINK SYNCHRONIZATION SIGNALS", filed Aug. 15, 2019, assigned to the assignee hereof and hereby expressly incorporated by reference herein in its entirety.

TECHNICAL FIELD

Various aspects described herein generally relate to resource selection for sidelink synchronization signals.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

SUMMARY

An embodiment is directed to a method of operating a user equipment (UE), comprising identifying a pool of resources where transmission of sidelink synchronization signals is permitted, the pool of resources comprising at least UE-specific resources, and transmitting a sidelink synchronization signal to one or more peer sidelink UEs based on a subset of the pool of resources.

Another embodiment is directed to a method of operating a user equipment (UE), comprising transmitting a synchronization request message to at least one peer sidelink UE, and receiving at least one sidelink synchronization signal from the at least one peer sidelink UE in response to the transmitting.

Another embodiment is directed to a method of operating a user equipment (UE), comprising receiving a sidelink synchronization signal from a peer sidelink UE based on a subset of a pool of resources where transmission of sidelink synchronization signals is permitted, the pool of resources comprising at least UE-specific resources, and synchronizing a clock at the UE based at least in part upon the sidelink synchronization signal.

Another embodiment is directed to a user equipment (UE), comprising means for identifying a pool of resources where transmission of sidelink synchronization signals is permitted, the pool of resources comprising at least UE-specific resources, and means for transmitting a sidelink synchronization signal to one or more peer sidelink UEs based on a subset of the pool of resources.

Another embodiment is directed to a user equipment (UE), comprising means for receiving a sidelink synchronization signal from a peer sidelink UE based on a subset of a pool of resources where transmission of sidelink synchronization signals is permitted, the pool of resources comprising at least UE-specific resources, and means for synchronizing a clock at the UE based at least in part upon the sidelink synchronization signal.

Another embodiment is directed to a user equipment (UE), comprising means for transmitting a synchronization request message to at least one peer sidelink UE, and means for receiving at least one sidelink synchronization signal from the at least one peer sidelink UE in response to the transmitting.

Another embodiment is directed to a user equipment (UE), comprising means for receiving a synchronization request message from a peer sidelink UE, and means for transmitting at least one sidelink synchronization signal to the peer sidelink UE in response to the synchronization request message.

Another embodiment is directed to a user equipment (UE), comprising a memory, at least one transceiver, and at least one processor coupled to the memory and the at least one transceiver and the at least one processor configured to identify a pool of resources where transmission of sidelink synchronization signals is permitted, the pool of resources comprising at least UE-specific resources, and transmit, via the at least one transceiver, a sidelink synchronization signal to one or more peer sidelink UEs based on a subset of the pool of resources.

Another embodiment is directed to a user equipment (UE), comprising a memory, at least one transceiver, and at least one processor coupled to the memory and the at least one transceiver and the at least one processor configured to receive a sidelink synchronization signal from a peer sidelink UE based on a subset of a pool of resources where transmission of sidelink synchronization signals is permitted, the pool of resources comprising at least UE-specific resources, and synchronize a clock at the UE based at least in part upon the sidelink synchronization signal.

Another embodiment is directed to a user equipment (UE), comprising a memory, at least one transceiver, and at least one processor coupled to the memory and the at least one transceiver and the at least one processor configured to transmit, via the at least one transceiver, a synchronization request message to at least one peer sidelink UE, and receive at least one sidelink synchronization signal from the at least one peer sidelink UE in response to the transmission.

Another embodiment is directed to a user equipment (UE), comprising a memory, at least one transceiver, and at least one processor coupled to the memory and the at least one transceiver and the at least one processor configured to receive a synchronization request message from a peer sidelink UE, and transmit at least one sidelink synchronization signal to the peer sidelink UE in response to the synchronization request message.

Another embodiment is directed to a non-transitory computer-readable medium containing instructions stored thereon, which, when executed by a user equipment (UE), cause the UE to perform actions, the instructions comprising at least one instruction configure to cause the UE to identify a pool of resources where transmission of sidelink synchronization signals is permitted, the pool of resources comprising at least UE-specific resources, and at least one instruction configure to cause the UE to transmit a sidelink synchronization signal to one or more peer sidelink UEs based on a subset of the pool of resources.

Another embodiment is directed to a non-transitory computer-readable medium containing instructions stored thereon, which, when executed by a user equipment (UE), cause the UE to perform actions, the instructions comprising at least one instruction configure to cause the UE to receive a sidelink synchronization signal from a peer sidelink UE based on a subset of a pool of resources where transmission of sidelink synchronization signals is permitted, the pool of resources comprising at least UE-specific resources, and at least one instruction configure to cause the UE to synchronize a clock at the UE based at least in part upon the sidelink synchronization signal.

Another embodiment is directed to a non-transitory computer-readable medium containing instructions stored thereon, which, when executed by a user equipment (UE), cause the UE to perform actions, the instructions comprising at least one instruction configure to cause the UE to transmit a synchronization request message to at least one peer sidelink UE, and at least one instruction configure to cause the UE to receive at least one sidelink synchronization signal from the at least one peer sidelink UE in response to the transmission.

Another embodiment is directed to a non-transitory computer-readable medium containing instructions stored thereon, which, when executed by a user equipment (UE), cause the UE to perform actions, the instructions comprising at least one instruction configure to cause the UE to receive a synchronization request message from a peer sidelink UE, and at least one instruction configure to cause the UE to transmit at least one sidelink synchronization signal to the peer sidelink UE in response to the synchronization request message.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
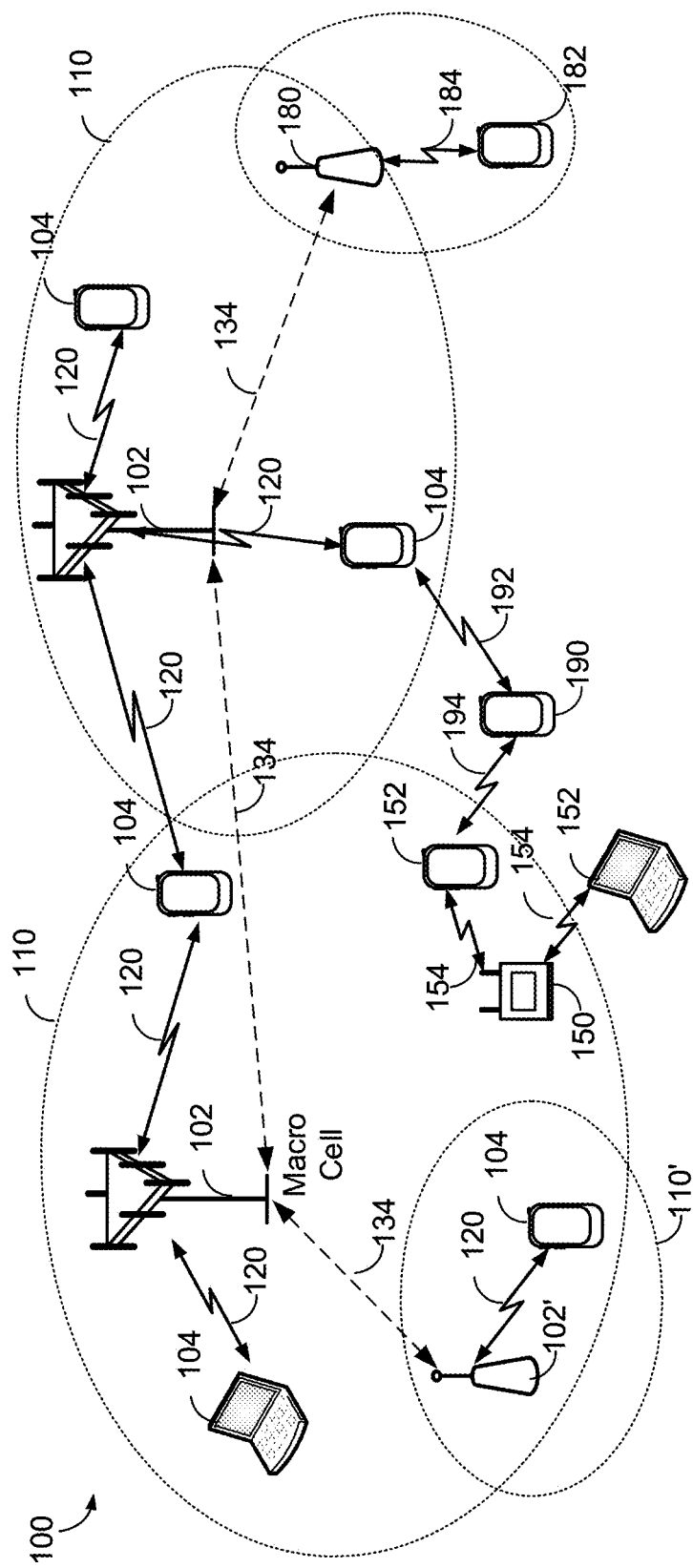
FIG. 1 illustrates an exemplary wireless communications system, according to various aspects.

Various aspects described herein generally relate to resource selection and/or on-demand requests for sidelink synchronization signals.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
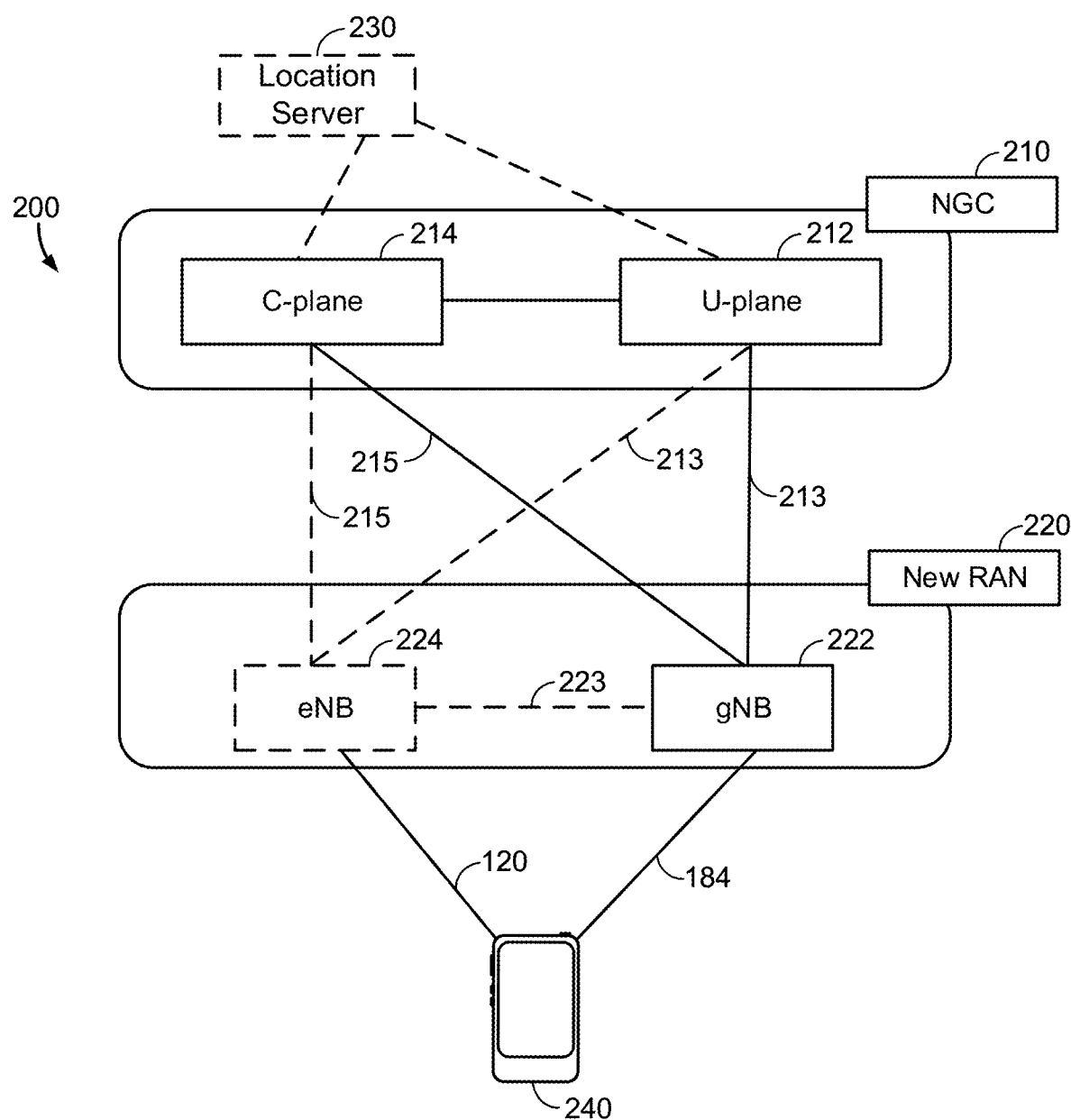
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 152, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
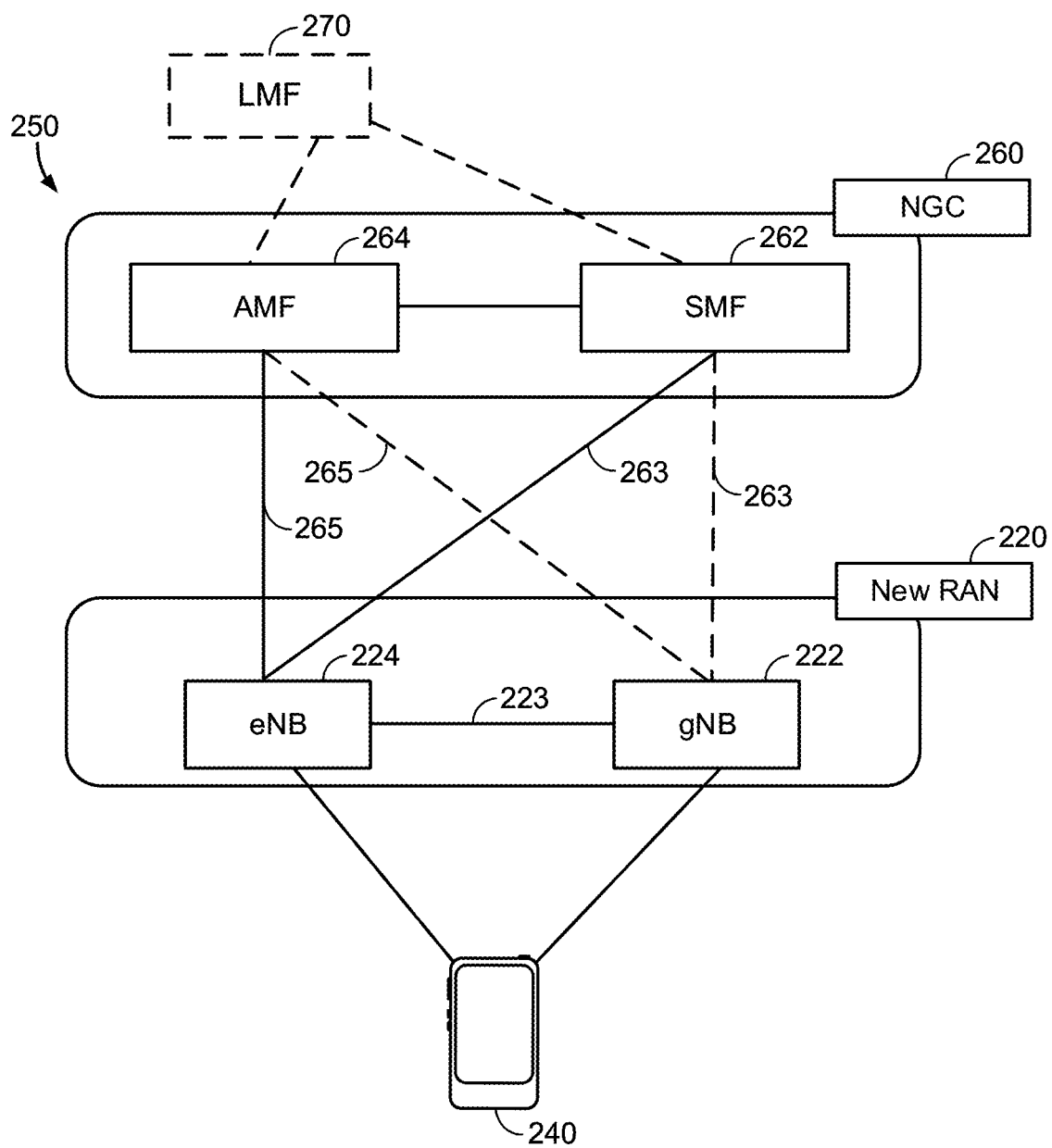

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3A:
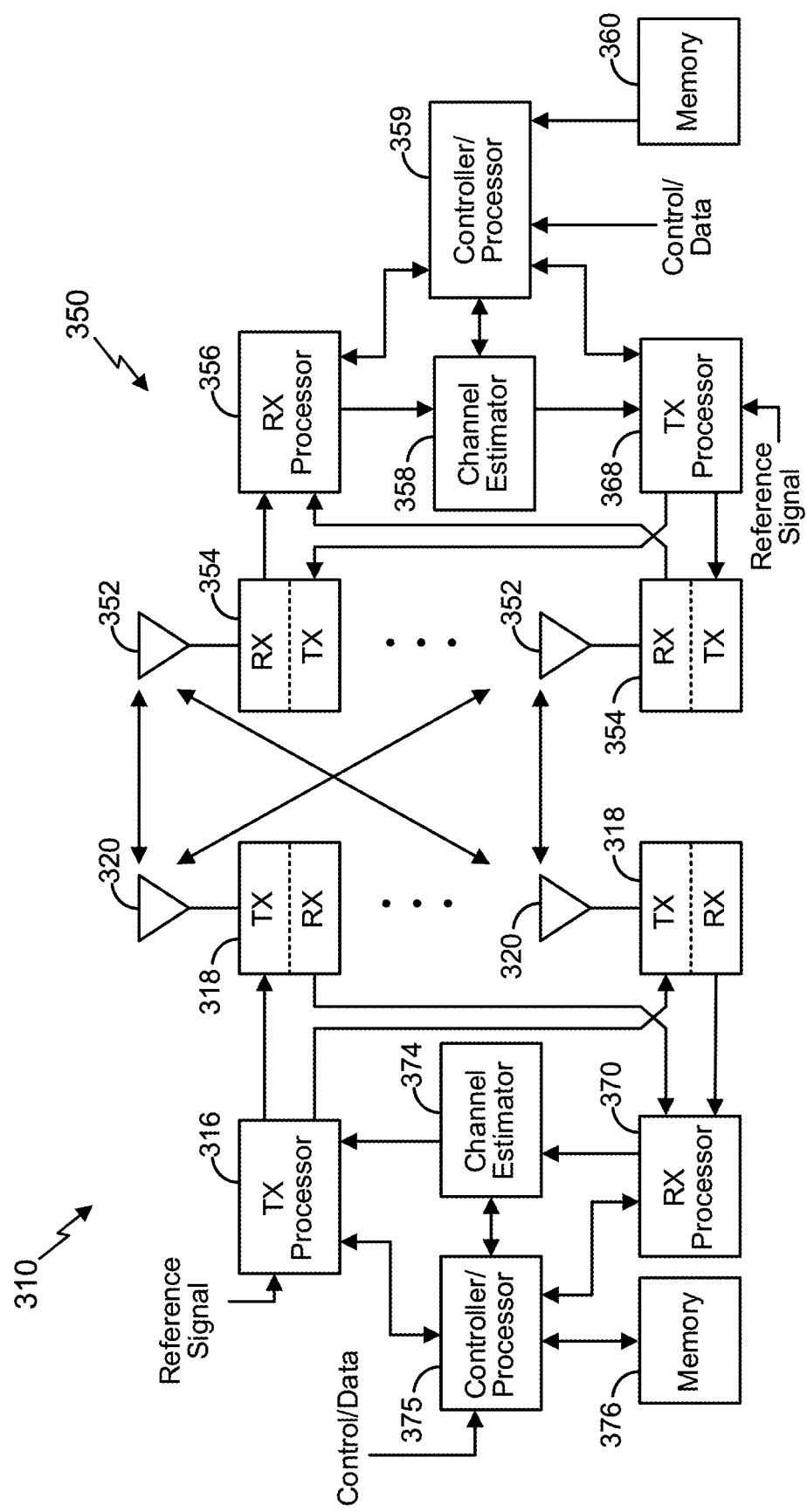
FIG. 3A illustrates an exemplary base station and an exemplary user equipment (UE) in an access network, according to various aspects.

According to various aspects, FIG. 3A illustrates an exemplary base station (BS) 310 (e.g., an eNB, a gNB, a small cell AP, a WLAN AP, etc.) in communication with an exemplary UE 350 (e.g., any of the UEs depicted in FIG. 1, such as UEs 104, UE 152, UE 182, UE 190, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the processing system 359, which implements Layer-3 and Layer-2 functionality.

The processing system 359 can be associated with a memory 360 that stores program codes and data. The memory 360 may be referred to as a non-transitory computer-readable medium. In the UL, the processing system 359 provides demultiplexing between transport and logical channels, packet reassembly, deciphering, header decompression, and control signal processing to recover IP packets from the core network. The processing system 359 is also responsible for error detection.

Similar to the functionality described in connection with the DL transmission by the base station 310, the processing system 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The processing system 375 can be associated with a memory 376 that stores program codes and data. The memory 376 may be referred to as a non-transitory computer-readable medium. In the UL, the processing system 375 provides demultiplexing between transport and logical channels, packet reassembly, deciphering, header decompression, control signal processing to recover IP packets from the UE 350. IP packets from the processing system 375 may be provided to the core network. The processing system 375 is also responsible for error detection.

Figure 3B:
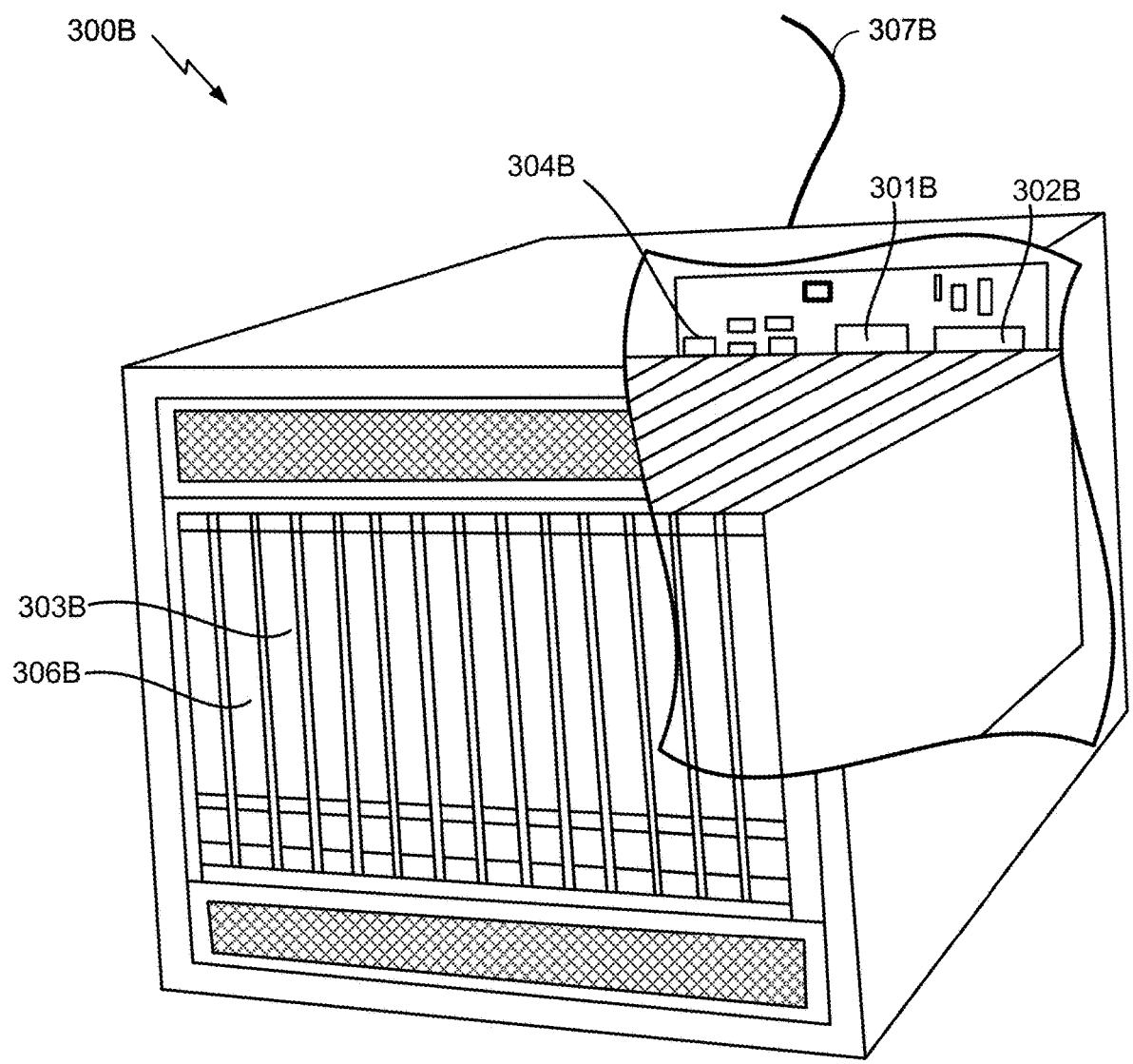
FIG. 3B illustrates an exemplary server according to various aspects.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
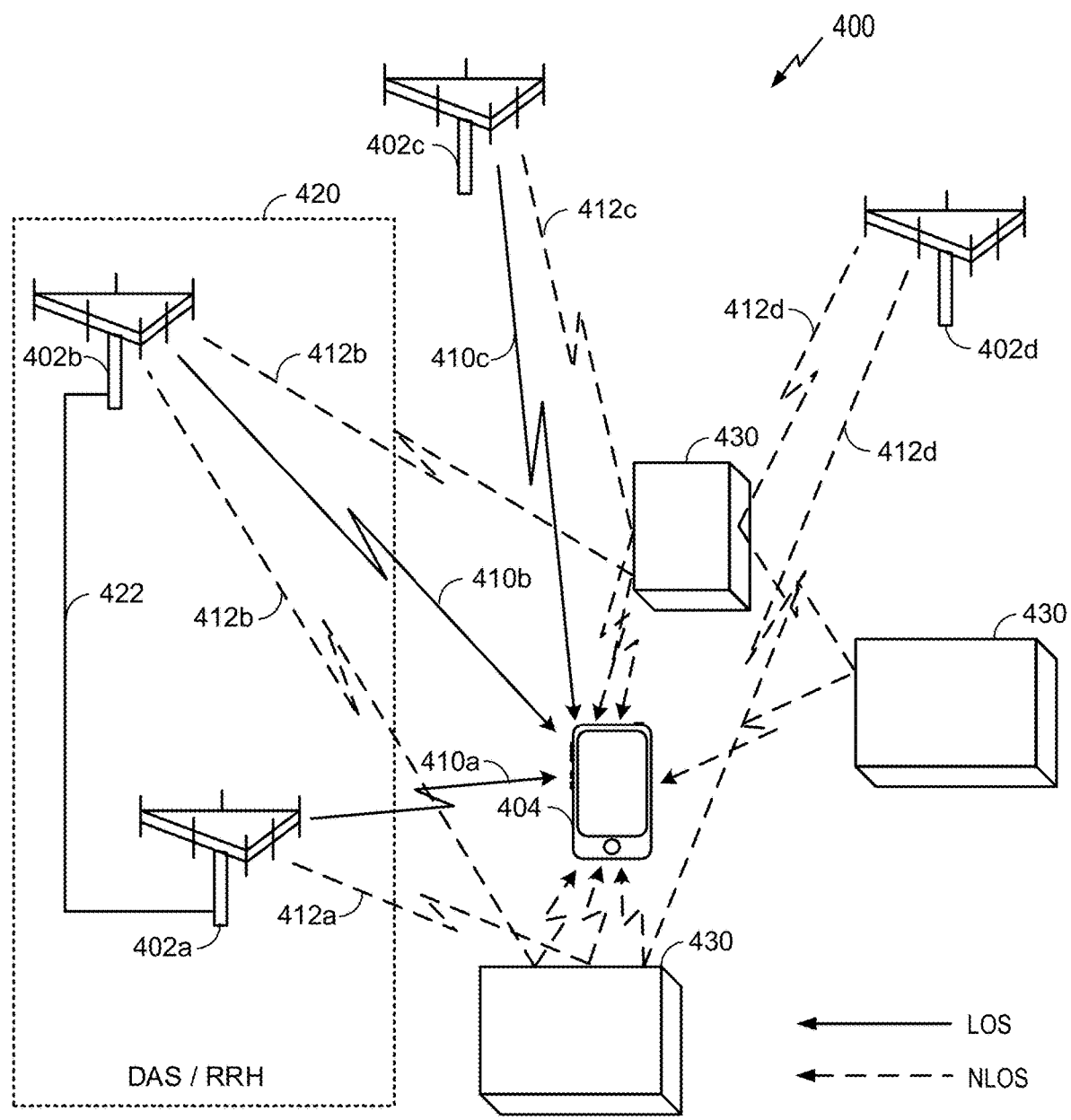
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

Sidelink communications relate to peer-to-peer communications between UEs in accordance with a device-to-device (D2D) protocol (e.g., V2V, V2X, LTE-D, WiFi-Direct, etc.). In some designs, synchronization (e.g., time and frequency synchronization) is achieved whereby one or more UEs act as a synchronization source (referred to as SyncRef UE). Generally, the peer UEs that belong to a particular sidelink communications network attempt to maintain a common reference time to facilitate sidelink communications among the peer UEs.

In some designs, sidelink communication links are decoupled from sidelink synchronization links. For example, two peer UEs participating in sidelink communication with each other are not required to designate one or the other as a synchronization source for deriving their respective time and frequency resources. In some designs, certain system-wide resources are designated or reserved for sidelink synchronization signaling in an SFN-based manner (e.g., in 3GPP Rel. 12, 2 resources are reserved for sidelink synchronization signaling at each synchronization period). In such an implementation, there is no beam management functionality that carries over from sidelink synchronization to sidelink communication (e.g., because the sidelink synchronization signaling is transported via an SFN-based manner).

In some designs, SyncRef UEs can be connected directly to a base station (e.g., gNB) or Global Navigation Satellite System (GNSS), as shown below with respect to FIG. 5. In other designs, SyncRef UEs can be indirectly connected to the base station or GNSS (e.g., more than one hop away via one or more peer UEs in the sidelink communications network). In yet other designs, SyncRef UEs can act as independent synchronization sources without any direct or indirect connection to a base station or GNSS.

Figure 5:
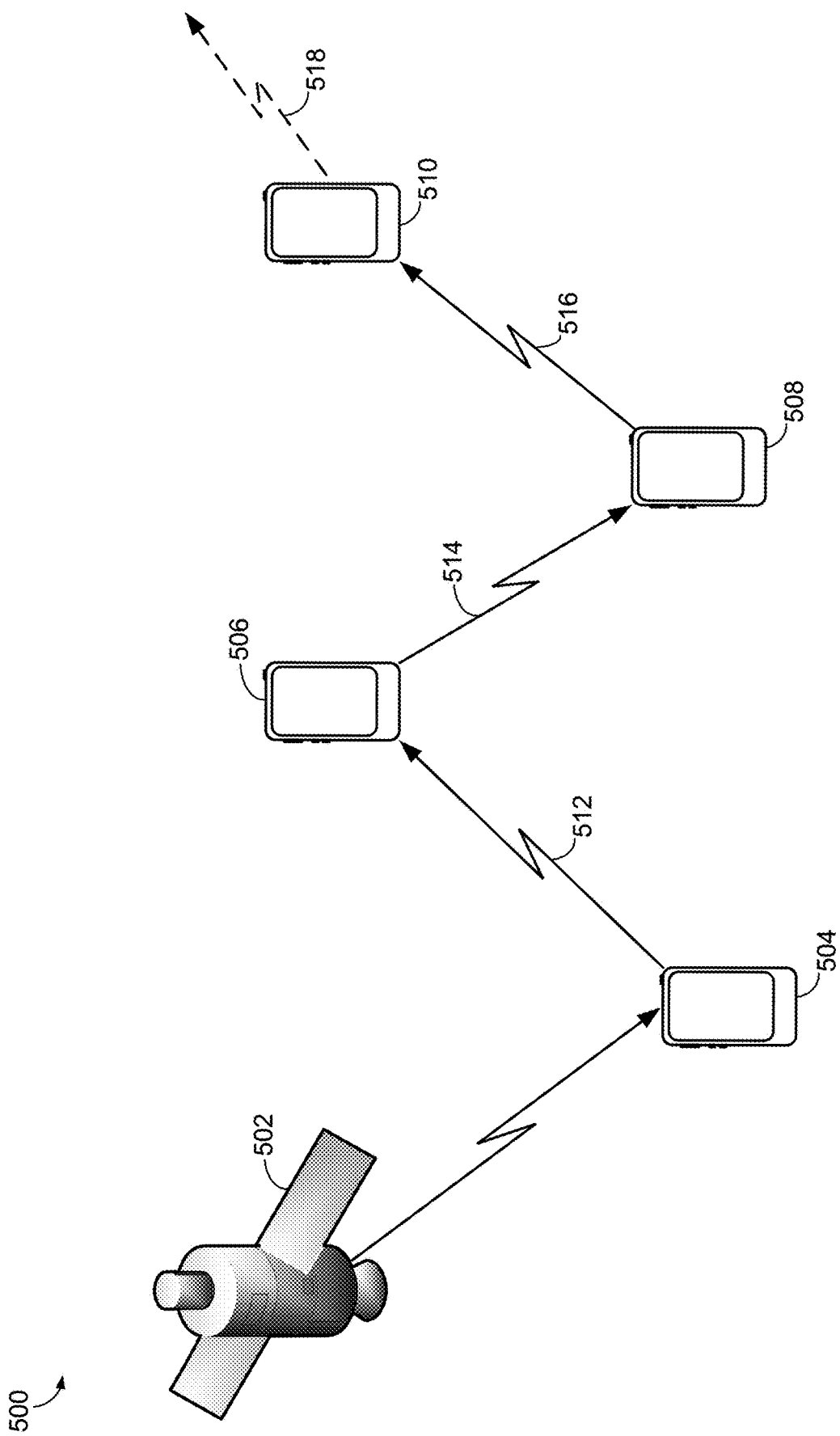
FIG. 5 illustrates a sidelink communications network 500 in accordance with an embodiment of the disclosure.

FIG. 5 illustrates a sidelink communications network 500 in accordance with an embodiment of the disclosure. Referring to FIG. 5, the sidelink communications network 500 comprises a GNSS satellite 502 and UEs 504, 506, 508 and 510. UE 504 is synchronized with a network clock of the GNSS satellite 502 based on receipt of various GNSS signals. UE 504 is connected to UE 506 via a sidelink communications link 512, UE 506 is connected to UE 508 via a sidelink communications link 514, and UE 508 is connected to UE 510 via a sidelink communications link 516. While not shown, one or more of UEs 504-510 may also be connected to a terrestrial communications network. In FIG. 5, UE 504 corresponds to the SyncRef UE. Also, while not shown, UE 510 may be further connected to yet another peer UE over a sidelink communications link 518, and so on.

As noted above, certain networks reserve 2 resources for sidelink synchronization signaling. In an example of such a system, the sidelink synchronization signaling over the sidelink communications links 512-516 may be configured as shown in Table 1, as follows:

TABLE 1

| Link | Synchronization Signal Configuration |
|---|---|
| 512 | Sidelink Synchronization Signal ID (SLSS ID) = 0<br>Subframe = Resource 1<br>INC = True |
| 514 | SLSS ID = SLSS ID of SyncRef UE (UE 504) + 168 = 0 + 168<br>Subframe = Resource 2<br>INC = False |
| 516 | SLSS ID = SLSS ID of SyncRef UE (UE 504) = 0<br>Subframe = Resource 1<br>INC = False |
| 518 | SLSS ID = SLSS ID of SyncRef UE (UE 504) = 0<br>Subframe = Resource 2<br>INC = False |

As shown in Table 1, the Subframe used for the SLSS transmission alternates at each hop in the sidelink communications network 500 between Resources 1 and 2 because there are only two available resources for the SLSS transmissions.

Figure 6:
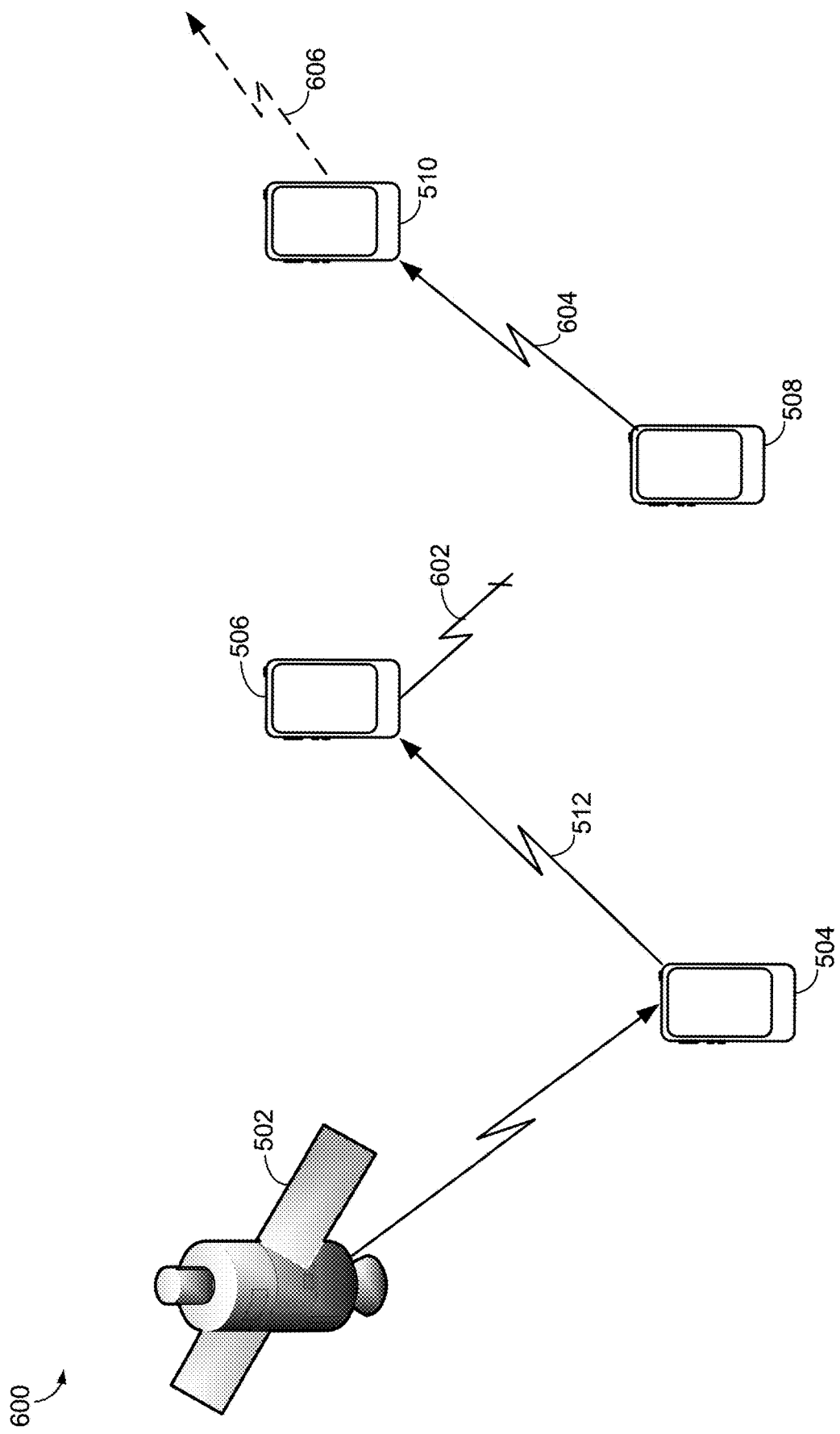
FIG. 6 illustrates a sidelink communications network in accordance with another embodiment of the disclosure.

FIG. 6 illustrates a sidelink communications network 600 in accordance with another embodiment of the disclosure. In FIG. 6, UE 506 and UE 508 lose their connection to each other as shown at 602. Hence, UEs 508 and 510 are disconnected from the GNSS-synchronized UE 504 which was acting as the SyncRef UE in the sidelink communications network 500 of FIG. 5. UEs 508-510 thereby form a new GNSS-independent sidelink communications network. In an example, assume that UE 508 becomes the SyncRef UE for the new GNSS-independent sidelink communications network. Also, while not shown, UE 510 may be further connected to yet another peer UE over a sidelink communications link 606, and so on.

In this case, in a system whereby 2 resources are reserved for sidelink synchronization signaling, the sidelink synchronization signaling over sidelink communications links 604-606 may be configured as shown in Table 2, as follows:

TABLE 2

| Link | Synchronization Signal Configuration |
|---|---|
| 604 | Sidelink Synchronization Signal ID (SLSS ID) = Random (e.g., between 170-355)<br>Subframe = Resource 1 or 2<br>INC = FALSE |

TABLE 2-continued

| Link | Synchronization Signal Configuration |
|---|---|
| 606 | SLSS ID = SLSS ID of SyncRef UE (UE 508) + 168 = 0 + 168<br>Subframe = Resource 1 or 2 (opposite of that used by UE 508)<br>INC = False |

For a UE that derives its synchronization from a SyncRef UE, a reference timing is the 'received timing' of the SyncRef UE's synchronization signals (e.g., SFNed) at the receiver (e.g., unsynchronized UE), in a manner that is analogous to downlink timing synchronization with respect to a base station. Sidelink physical channels and signals (for communication) may be transmitted based on this reference timing. In some designs, sidelink communications networks do not support a timing advance (TA) as in the case of UE-to-gNB uplink. In such sidelink communications networks, the propagation delay along each hop in the sidelink communications network contributes to a timing error between the SyncRef UE and each successive UE at each hop of the sidelink communications network. This timing error depends on the propagation distance along each hop as well as the number of hops from the original synchronization source (e.g., hops from GNSS satellite 502 or terrestrial base station, or the SyncRef UE itself in the case of an unsynchronized network).

Figure 7:
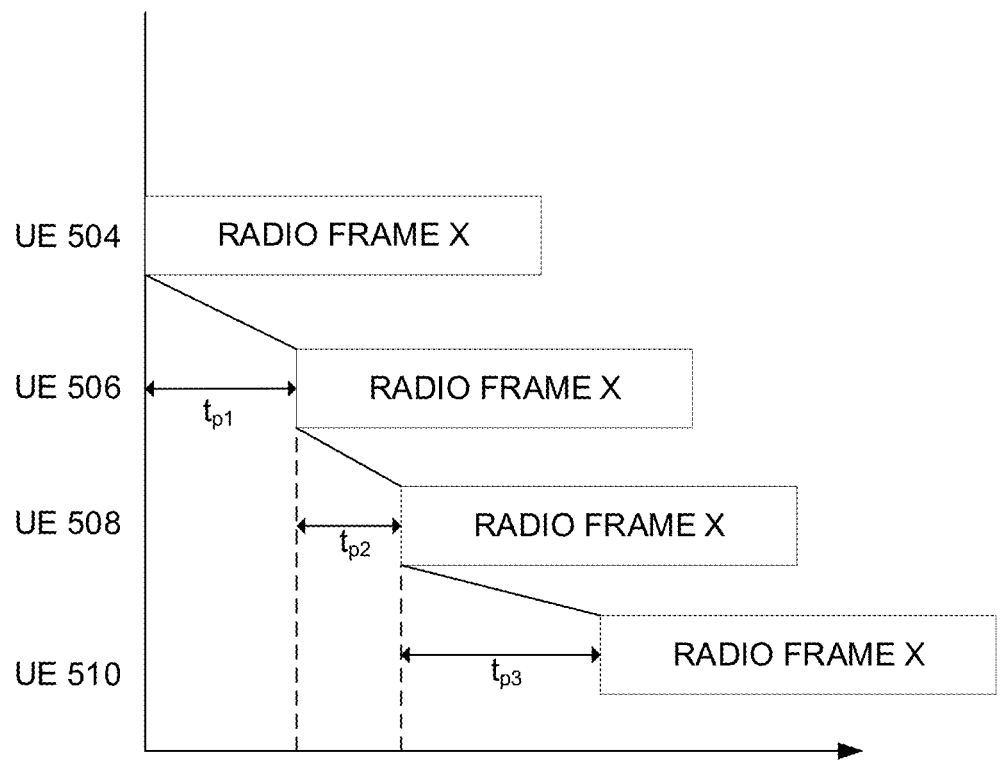
FIG. 7 illustrates successively higher timing errors along hops of the sidelink communications network in accordance with an embodiment of the disclosure.

FIG. 7 illustrates successively higher timing errors along hops of the sidelink communications network 500 in accordance with an embodiment of the disclosure. In particular, timing errors are shown in FIG. 7 relative to a particular radio frame denoted as radio frame X. Referring to FIG. 7, UE 504's timing is set to the GNSS timing, UE 506's timing is set to UE 504's timing plus a propagation delay $t_{p1}$, UE 508's timing is set to UE 506's timing plus a propagation delay $t_{p2}$, UE 510's timing is set to UE 508's timing plus a propagation delay $t_{p3}$, and so on. Accordingly, the further away a peer UE from the SyncRef UE in terms of hops, the greater the timing error. Moreover, while FIG. 7 is described with respect to the GNSS-synchronized sidelink communications network 500 of FIG. 5, the same problem occurs in sidelink communications networks which lack synchronization with a network clock.

Figure 8:
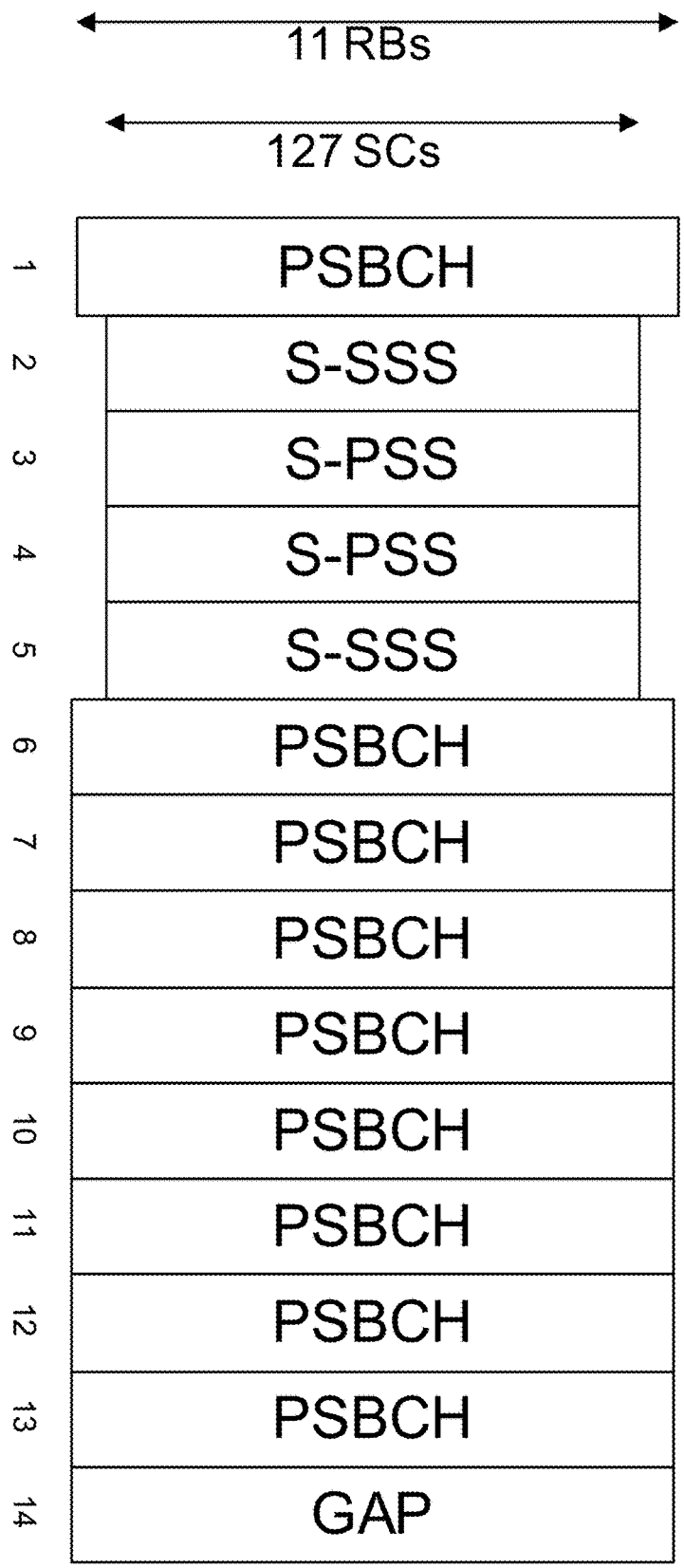
FIG. 8 illustrates an example frame structure that supports sidelink synchronization signals in accordance with an embodiment of the disclosure.

FIG. 8 illustrates an example frame structure 800 that supports sidelink synchronization signals in accordance with an embodiment of the disclosure. As shown in FIG. 8, the frame structure 800 includes 14 subframes, with subframes 2 and 5 allocated to sidelink secondary synchronization signals (S-SSS), subframes 3-4 allocated to sidelink primary synchronization signals (S-PSS), subframes 6-13 allocated to PSBCH and subframe 14 functioning as a gap. In some designs, the sidelink sync signal block (S-SSB, which comprises S-PSS and S-SSS) periodicity may be 160 ms, although this period may be configurable. In some designs, the frame structure 800 may be used to support vehicle-based communications, such as NR vehicle-to-everything (V2X) communications. Among other things, the frame structure 800 may be used for sidelink communication-related functionality, including resource selection, S-SSB ID determination, SyncRef UE selection and/or re-selection, and so on.

Some 5G NR sidelink designs are targeted towards more generalized use cases, while not being targeted to particular UE types or particular sidelink scenarios. For example, some UE types such as wearable devices and IoT devices may prioritize power consumption more highly than other UE types such as plug-in devices or phones. In a further example, wearable devices and IoT devices may lack the capacity to directly connect to a GNSS or terrestrial network and may thereby require synchronization from a primary device (e.g., a GNSS-capable or network-capable device). In a further example, in mmW sidelink where beam management is central to sidelink data communications, it may be desirable to derive at least part of the initial transmit/receive beam information based on the beams used for transmission or reception of the sidelink synchronization signals. In a further example, sidelink relays where UEs are deriving synchronization from a base station (e.g., gNB) may suffer from intermittent gNB coverage loss, in which case a request-response-based synchronization mechanism may be preferable.

Embodiments of the disclosure are directed to mechanisms by which resources are identified for transmission of sidelink synchronization signals. In particular, a pool of resources (e.g., time and frequency resources) may be defined from which a subset of resources is identified for sidelink synchronization signals.

Figure 9:
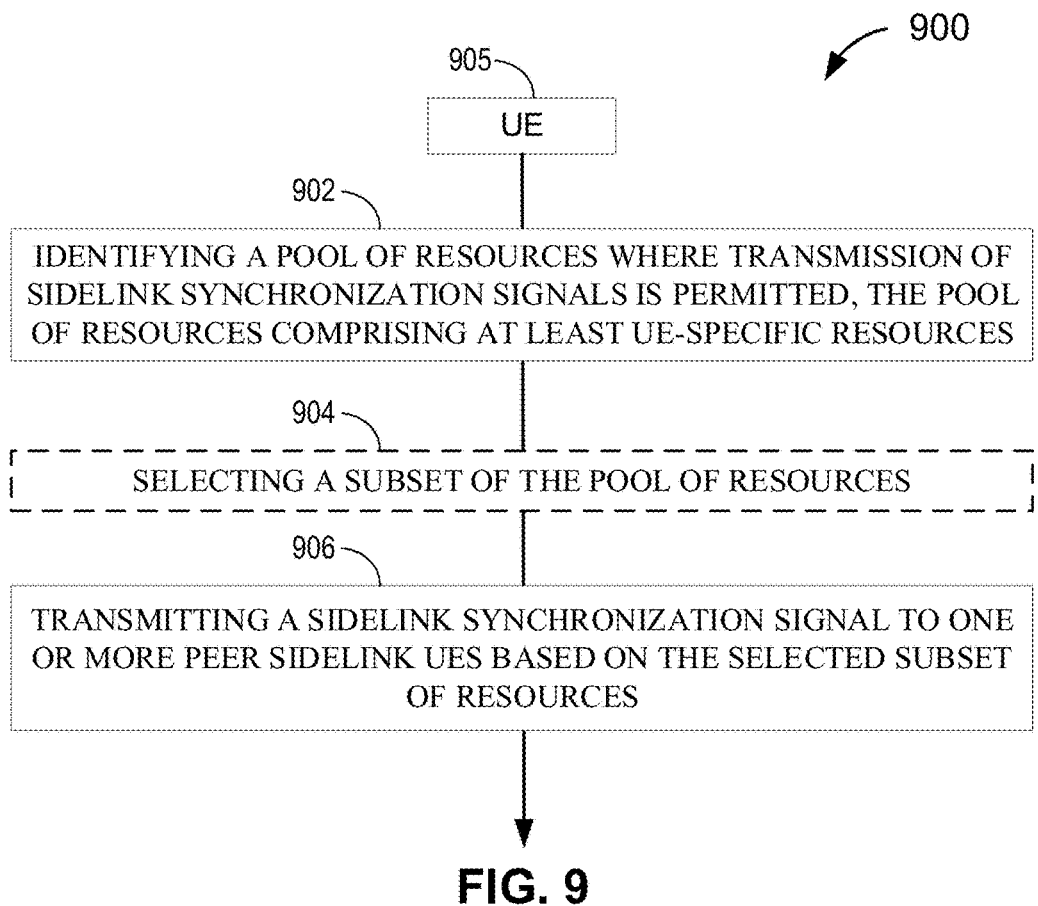
FIG. 9 illustrates an exemplary process of selecting resources for a sidelink synchronization signal according to another aspect of the disclosure.

FIG. 9 illustrates an exemplary process 900 of selecting resources for a sidelink synchronization signal according to an aspect of the disclosure. The process 900 of FIG. 9 is performed by a UE 905, which may correspond to any of the above-noted UEs (e.g., UE 240, 350, 504, 506, 508, 510, etc.). In some designs, the process 900 of FIG. 9 may be performed while the UE 905 is directly or indirectly synchronized with respect to a network clock, while in other designs the process 900 of FIG. 9 may be performed while the UE 905 is unsynchronized with respect to a network clock.

At 902, the UE 905 (e.g., controller/processor 359) identifies a pool of resources where transmission of sidelink synchronization signals is permitted, the pool of resources comprising at least UE-specific resources. In an example, the UE-specific resources may be assigned to the UE 905 by a base station (e.g., gNB). The UE-specific resources may be distinguished from the system-wide resources that are reserved for sidelink synchronization signals as described above (e.g., 2 resources are reserved system-wide for sidelink synchronization signaling at each synchronization period). Accordingly, by including the UE-specific resources in the pool, the UE 905 is not limited to using the reserved system-wide resources.

In some designs, some or all of the reserved system-wide resources for sidelink synchronization signaling may also be included in the pool at 902. However, this is not strictly required. For example, the reserved system-wide resources for sidelink synchronization signaling may be omitted from the pool for use by legacy devices that do not factor UE-specific resources for sidelink synchronization signaling in some designs.

At 904, the UE 905 (e.g., controller/processor 359) optionally selects a subset of the pool of resources. Alternatively, the selection of 904 may occur via an external entity and then conveyed to the UE 905. Irrespective of the entity which makes the selection at 904, the selection of 904 may be performed in a variety of ways. For example, UE 905 may monitor which resources are being used for sidelink synchronization signaling by other peer UEs and then select the subset at 904 so as not to conflict with the resources detected as being used by these peer UEs. In some designs, UE-specific resources may be selected as part of the subset at 904 so that reserved system-wide resources for sidelink synchronization signaling remain available for use by legacy devices. In some designs, the subset may be selected at 904 so as to include a combination of both UE-specific resources and reserved system-wide resources (e.g., SFNed resources). In this case, configured or preconfigured periodic resources configured for SFNed synchronization signal transmission (e.g., reserved system-wide synchronization signal resources) can be supplemented by additional resources that the UE can obtain for non-SFNed synchronization signal transmission.

In some designs, the selection of 904 may select between UE-specific resources or reserved system-wide resources based on a triggering condition (e.g., if RSRP to a synchronization source (e.g., a gNB or another UE) is below a threshold). For example, assume that the pool of resources is Set A, and the selected subset of resources at 904 is Set B. Set B is the union of Sets B1 and B2, whereby Set B1 is the SFNed resource set (e.g., the reserved system-wide resources) and Set B2 is the non-SFNed resource set (e.g., the UE-specific resources). In this case, triggers (e.g., RSRP thresholds) for B1 and B2 may be configured differently (e.g., such triggers or thresholds may be preconfigured at the UE 905).

At 906, the UE 905 (e.g., controller/processor 359, antenna(s) 352, transmitter(s) 354, and/or TX processor 368) transmits a sidelink synchronization signal to one or more peer sidelink UEs based on the selected subset of resources.

Figure 10:
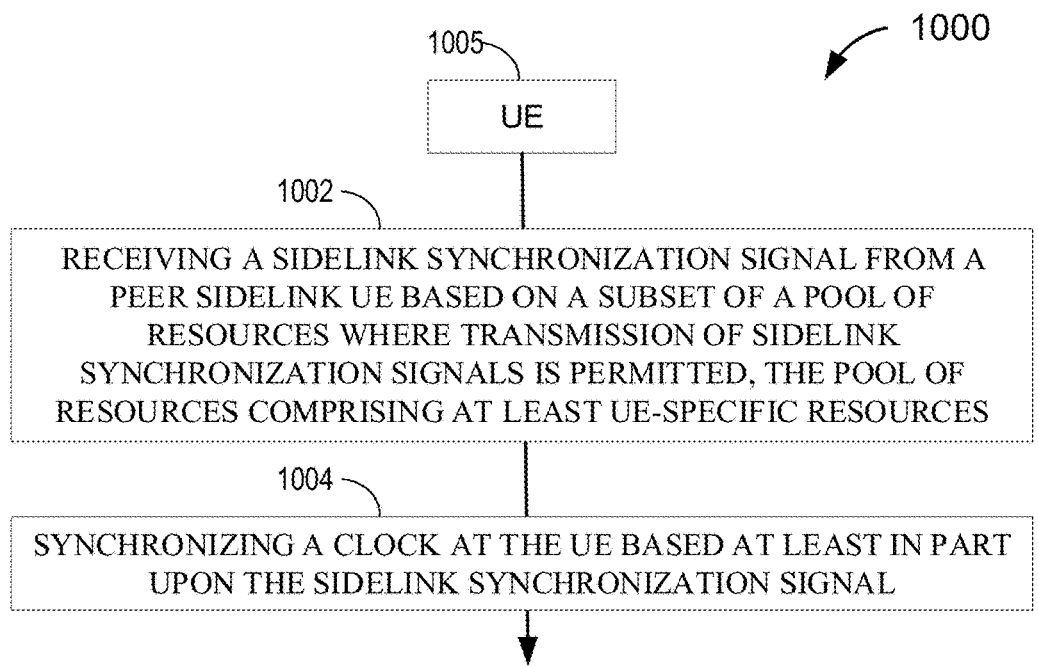
FIG. 10 illustrates an exemplary process of selecting resources for a sidelink synchronization signal according to another aspect of the disclosure.

FIG. 10 illustrates an exemplary process 1000 of transporting a sidelink synchronization signal on selected resources according to an aspect of the disclosure. The process 1000 of FIG. 10 is performed by a UE 1005, which may correspond to any of the above-noted UEs (e.g., UE 240, 350, 504, 506, 508, 510, etc.). In some designs, the process 1000 of FIG. 10 may be performed while the UE 1005 is directly or indirectly synchronized with respect to a network clock, while in other designs the process 1000 of FIG. 10 may be performed while the UE 1005 is unsynchronized with respect to a network clock.

At 1002, the UE 1005 (e.g., antennas 342, demodulator 354, receive processor 356, etc.) receives a sidelink synchronization signal from a peer sidelink UE based on a subset of a pool of resources where transmission of sidelink synchronization signals is permitted, the pool of resources comprising at least UE-specific resources. For example, the sidelink synchronization signal received at 1002 may correspond to the sidelink synchronization signal transmitted by UE 905 at 906. In an example, the UE-specific resources may be assigned to the peer sidelink UE (e.g., UE 905) by a base station (e.g., gNB). The UE-specific resources may be distinguished from the system-wide resources that are reserved for sidelink synchronization signals as described above (e.g., 2 resources are reserved system-wide for sidelink synchronization signaling at each synchronization period). Accordingly, by including the UE-specific resources in the pool, the peer sidelink UE is not limited to using the reserved system-wide resources. The subset of resources over which the sidelink synchronization signal and/or the pool of resources associated with the sidelink synchronization signal may likewise be configured and/or selected as described above with respect to FIG. 9.

At 1004, the UE 1005 (e.g., controller/processor 359) synchronizes a clock at the UE based at least in part upon the sidelink synchronization signal. In some designs, such synchronization may provide various technical advantages, such as clock synchronization for sidelink communications in a scenario where UE 1005 has lost synchronization with respect to a network clock.

In some designs, the selection of 904 and the transmission of 906 or 1002 may be performed in an on-demand manner (e.g., in response to a request from one or more peer UEs, such as a wearable device). In this case, the selected resource(s) may comprise a sidelink communication resource (e.g., used for normal data traffic) in which case the sidelink synchronization signal need not be periodic.

In other designs, the selection of 904 and the transmission of 906 or 1002 may be performed in an opportunistic manner. For example, the UE 905 may detect that the selected resource(s) do not conflict with a peer sidelink UE or a gNB, and may then transmit the sidelink communication signal at 906 in response to this detection.

In other designs, the selection of 904 and the transmission of 906 or 1002 may be performed in a periodic manner. For example, the selected resource(s) may comprise only some or all of the reserved system-wide resources, even though the UE-specific resources could have been selected from the pool at 904.

Referring to FIGS. 9-10, in some designs, the transmission at 906 or 1002 may occur one or times. In some designs, the transmission at 906 or 1002 may repeat on a periodic basis, which may comprises multiple transmission periods (or intervals). For example, a first set of sidelink synchronization signals may repeat at a lower periodicity (e.g., 160 indefinitely (e.g., until a new periodicity is determined, etc.) while a second set of sidelink synchronization signal may repeat at a higher periodicity (e.g., 5 ms) with a certain duration (e.g., 10 times). In some designs, the first set of sidelink synchronization signals that repeat at the low periodicity may be transported using the SFNed (or reserved system-wide) synchronization resources, while the second set of sidelink synchronization signals that repeat at the higher periodicity may be transported using the non-SFNed (or UE-specific) synchronization resources. In this case, the first set of sidelink synchronization signals may provide coarse timing/frequency synchronization while the non-SFNed (e.g., UE-specific, such as unicast) may be used for finer timing/frequency synchronization. In some designs, the transmission of the sidelink synchronization signal on SFNed resources (or reserved system-wide resources) may be performed periodically based on a self-triggering condition(s) (e.g., turn on periodic sidelink synchronization signal transmissions when RSRP from a synchronization source is below a threshold, etc.), while transmission on non-SFNed resources (or UE-specific resources) may be performed in response to a request from a peer sidelink UE (e.g., an on-demand or event-based trigger). The SFNed and non-SFNed synchronization resources may thereby used in conjunction with each other to improve overall synchronization in some designs.

Referring to FIGS. 9-10, in some designs, the UE 905 may transmit an indication signal that indicates the selected resource(s) from 904 to one or more peer sidelink UEs (e.g., including UE 1005), such as a peer sidelink UE that requested transmission of the sidelink synchronization signal. For example, the indication signal may put the one or more peer sidelink UEs on notice of a potential sidelink synchronization signal over those selected resource(s), so the one or more peer sidelink UEs can scan or search within the selected resource(s) for the sidelink synchronization signal. For example, the indication signal may comprise two bits to indicate that one of a plurality of transmission window opportunities, such as the next 0-40 ms, 40-80 ms, 80-120 ms or 120-160 ms. The one or more peer sidelink UEs may then monitor the designated transmission window opportunity to receive the sidelink synchronization signal. In some designs, the indication signals may be tied to corresponding sidelink synchronization signals in time (e.g., indication is only transmitted 5 ms to 10 ms earlier than the sidelink synchronization signals). In this case, the two bits of the indication signal may be used to indicate a plurality of transmission window opportunities, such as the next 5-10 ms, 45-50 ms, 85-90 ms or 125-130 ms. In some designs, the indication signal may contain fewer bits than the sidelink synchronization signal.

Figure 11:
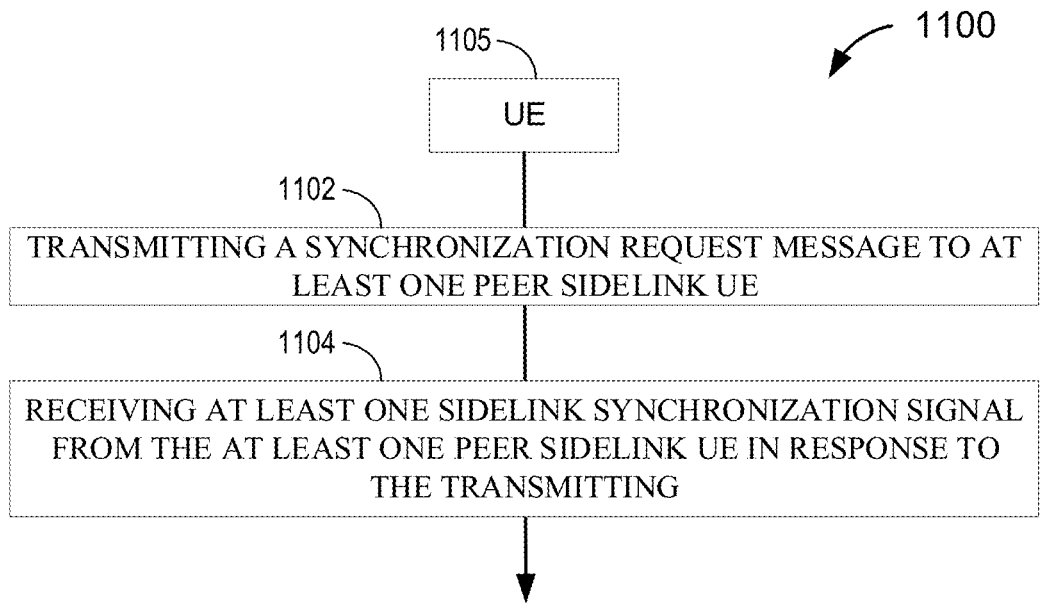
FIG. 11 illustrates an exemplary process of selecting resources for a sidelink synchronization signal according to another aspect of the disclosure.

FIG. 11 illustrates an exemplary process 1100 of requesting a sidelink synchronization signal according to an aspect of the disclosure. The process 1100 of FIG. 11 is performed by a UE 1105, which may correspond to any of the above-noted UEs (e.g., UE 240, 350, 504, 506, 508, 510, etc.). In some designs, the process 1100 of FIG. 11 may be performed while the UE 1105 is directly or indirectly synchronized with respect to a network clock, while in other designs the process 1100 of FIG. 11 may be performed while the UE 1105 is unsynchronized with respect to a network clock.

At 1102, the UE 1105 (e.g., controller/processor 359, antenna(s) 352, transmitter(s) 354, and/or TX processor 368) transmits a synchronization request message to at least one peer sidelink UE. At 1104, the UE (e.g., controller/processor 359, antenna(s) 352, receiver(s) 354, RX processor 356) receives at least one sidelink synchronization signal from the at least one peer sidelink UE in response to the transmission of 1102.

Figure 12:
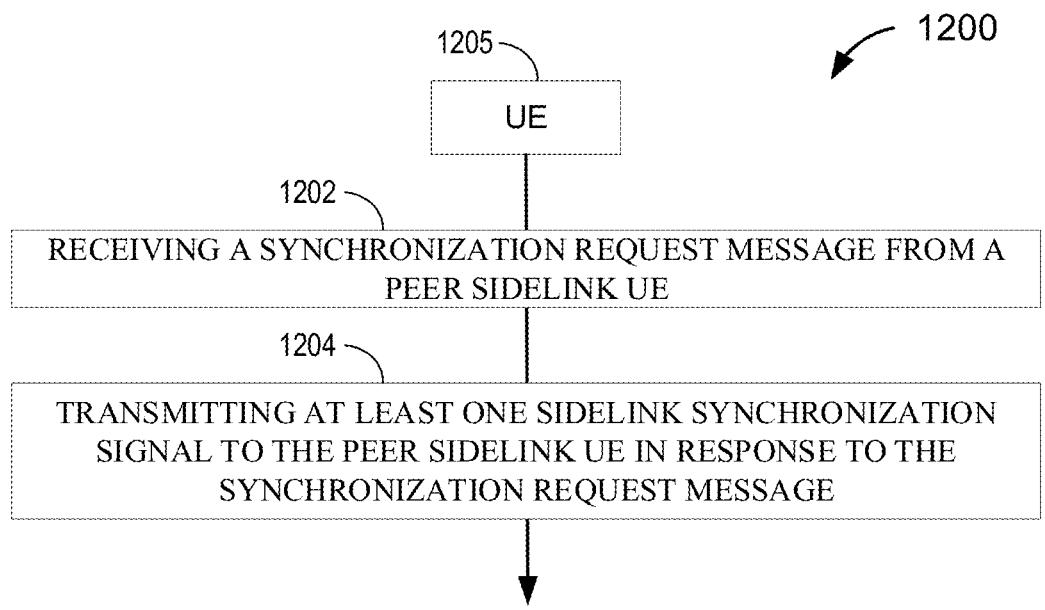
FIG. 12 illustrates an exemplary process of requesting a sidelink synchronization signal according to another aspect of the disclosure.

FIG. 12 illustrates an exemplary process 1200 of transmitting an on-demand sidelink synchronization signal according to an aspect of the disclosure. The process 1200 of FIG. 12 is performed by a UE 1205, which may correspond to any of the above-noted UEs (e.g., UE 240, 350, 504, 506, 508, 510, etc.). In some designs, the process 1200 of FIG. 12 may be performed while the UE 1205 is directly or indirectly synchronized with respect to a network clock, while in other designs the process 1200 of FIG. 12 may be performed while the UE 1205 is unsynchronized with respect to a network clock.

At 1202, the UE 1205 (e.g., controller/processor 359, antennas 342, demodulator 354, receive processor 356, etc.) receives a synchronization request message from a peer sidelink UE. At 1204, the UE 1205 (e.g., controller/processor 359, antenna(s) 352, transmitter(s) 354, and/or TX processor 368) transmits at least one sidelink synchronization signal to the peer sidelink UE in response to the synchronization request message.

Referring to FIGS. 11-12, in some designs, the transmission of 1102 or 1202 is triggered in response to synchronization failure by the UE 1105 (e.g., the UE 1105 becomes unsynchronized with respect to a network clock). In a specific example, assume the 1105 loses GNSS-based synchronization. In this case, the UE 1105 can still transmit for a few seconds as its oscillator will not have drifted beyond a critical point associated with excessive transmission rate errors. Hence, the UE 1105 can take advantage of these few seconds to perform the transmission of 1102 or 1202 and then try to use the sidelink synchronization signal(s) received at 1104 or 1204 to switch its synchronization source to a SyncRef UE (which may or may not itself be synchronized to an external network such as a GNSS). In some designs, the transmission of 1102 or 1202 is triggered in response to detection of a quality of a current synchronization source (e.g., RSRP) dropping below a threshold.

Referring to FIGS. 11-12, in an example, the synchronization request message may be transmitted over a sidelink communication channel (e.g., as a Medium Access Control (MAC) Control Element (CE)). In another example, the synchronization request message may be transmitted via unicast (e.g., to a particular sidelink peer UE functioning as a relay UE. In another example, the synchronization request message may be transmitted via multicast or broadcast (e.g., to any nearby UE in proximity, SOS-like). Referring to FIGS. 11-12, in some designs, the transmission of 1102 or 1202 may trigger the selection and transmission of 904-906 of FIG. 9.

In further designs, the various operations described above with respect to FIGS. 9-12 may be implemented via various "means", such as particular hardware components of the associated UEs 905 and 1105. For example, means for receiving and transmitting aspects of 906 and 1102-1104 may correspond to any combination of transceiver-related circuitry on the respective UEs, such as antenna(s) 352, receiver(s) 354, RX processor 356, transmitter(s) 354, Tx processor 368, etc. of UE 350 of FIG. 3A. In a further example, means for determining and selecting aspects of 902-904 may correspond to any combination of processor-related circuitry on the respective UEs, such as controller/processor 359 of UE 350 of FIG. 3A.

While some of the embodiments are described above with respect to specific numerologies (e.g., 15 kHz SCS), other embodiments may be directed to implementations whereby different numerologies are used (e.g., 30 kHz SCS, 60 kHz SCS, 120 kHz SCS, 240 kHz SCS, 480 kHz SCS, etc.).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a user equipment (UE), comprising:
    identifying a pool of resources where transmission of sidelink synchronization signals is permitted, the pool of resources comprising at least UE-specific resources with a first reference timing that is independent of any non-UE synchronization source, wherein the UE is synchronized with a second reference timing that is based on a non-UE synchronization source; and
    transmitting a sidelink synchronization signal to one or more peer sidelink UEs based on a subset of the pool of resources.

2. The method of claim 1, wherein the pool of resources further comprises system-wide resources reserved for sidelink synchronization signal transmissions.

3. The method of claim 1,
    wherein the subset of resources comprises at least part of the UE-specific resources, or
    wherein the subset of resources comprises at least part of the reserved system-wide resources, or
    any combination thereof.

4. The method of claim 1, wherein the subset of resources comprises at least part of the UE-specific resources.

5. The method of claim 1, wherein the transmitting transmits the sidelink synchronization signal in response to a request from at least one of the one or more peer sidelink UEs in an on-demand manner.

6. The method of claim 1, further comprising:
    determining that the subset of resources will not interfere with the one or more peer sidelink UEs and/or a base station,
    wherein the transmitting is performed in response to the determining in an opportunistic manner.

7. The method of claim 1, wherein the transmitting repeats periodically.

8. The method of claim 7, wherein the periodic transmitting comprises:
    transmitting a first set of synchronization signals in accordance with a first periodicity, and
    transmitting a second set of synchronization signals in accordance with a second periodicity.

9. The method of claim 8,
    wherein the first periodicity is higher than the second periodicity,
    wherein the first set of synchronization signals is transmitted over a first part of the subset of resources corresponding to system-wide resources reserved for sidelink synchronization signal transmissions, and
    wherein the second set of synchronization signals is transmitted over a second part of the subset of resources corresponding to at least part of the UE-specific resources.

10. The method of claim 7, wherein the periodic transmitting comprises:
    transmitting a first set of synchronization signals in accordance with a first periodicity, and
    transmitting a second set of synchronization signals in an on-demand manner.

11. The method of claim 10,
    wherein the first set of synchronization signals is transmitted over a first part of the subset of resources corresponding to system-wide resources reserved for sidelink synchronization signal transmissions, and
    wherein the second set of synchronization signals is transmitted over a second part of the subset of resources corresponding to at least part of the UE-specific resources.

12. The method of claim 10, wherein the second set of synchronization signals is transmitted in response to a synchronization request received from another peer sidelink UE or a synchronization quality dropping below a threshold.

13. The method of claim 1, wherein the pool of resources and the subset of resources each comprise resources defined in terms of a combination of time and frequency.

14. The method of claim 1, further comprising:
transmitting an indication signal to the one or more peer sidelink UEs to indicate the subset of the pool of resources.

15. A method of operating a user equipment (UE), comprising:
receiving a sidelink synchronization signal from a peer sidelink UE based on a subset of a pool of resources where transmission of sidelink synchronization signals is permitted, the pool of resources comprising at least UE-specific resources with a first reference timing that is independent of any non-UE synchronization source, wherein the peer sidelink UE is synchronized with a second reference timing that is based on a non-UE synchronization source; and
synchronizing a clock at the UE based at least in part upon the sidelink synchronization signal.

16. The method of claim 15, wherein the pool of resources further comprises system-wide resources reserved for sidelink synchronization signal transmissions.

17. The method of claim 15,
wherein the subset of resources comprises at least part of the UE-specific resources, or
wherein the subset of resources comprises at least part of the reserved system-wide resources, or
any combination thereof.

18. The method of claim 15, wherein the subset of resources comprises at least part of the UE-specific resources.

19. The method of claim 15, further comprising:
transmitting a request for the sidelink synchronization signal to the peer sidelink UE,
wherein the sidelink synchronization signal is received in response to the request in an on-demand manner.

20. The method of claim 15, wherein the receiving repeats periodically.

21. The method of claim 20, wherein the periodic receiving:
receiving a first set of synchronization signals in accordance with a first periodicity, and
receiving a second set of synchronization signals in accordance with a second periodicity.

22. The method of claim 21,
wherein the first periodicity is higher than the second periodicity,
wherein the first set of synchronization signals is received over a first part of the subset of resources corresponding to system-wide resources reserved for sidelink synchronization signal transmissions, and
wherein the second set of synchronization signals is received over a second part of the subset of resources corresponding to at least part of the UE-specific resources.

23. The method of claim 20, wherein the periodic transmitting comprises:
receiving a first set of synchronization signals in accordance with a first periodicity, and
receiving a second set of synchronization signals in an on-demand manner.

24. The method of claim 23,
wherein the first set of synchronization signals is received over a first part of the subset of resources corresponding to system-wide resources reserved for sidelink synchronization signal transmissions, and
wherein the second set of synchronization signals is received over a second part of the subset of resources corresponding to at least part of the UE-specific resources.

25. The method of claim 15, wherein the pool of resources and the subset of resources each comprise resources defined in terms of a combination of time and frequency.

26. The method of claim 15, further comprising:
receiving an indication signal from the peer sidelink UE that indicates the subset of the pool of resources.

27. A method of operating a user equipment (UE), comprising:
transmitting a synchronization request message to at least one peer sidelink UE; and
receiving, on one or more UE-specific resources with a first reference timing that is independent of any non-UE synchronization source in advance of a next periodic sidelink synchronization signal that is received at the UE subsequent to the transmission of the synchronization request message, at least one sidelink synchronization signal from the at least one peer sidelink UE in response to the transmitting, wherein the at least one peer sidelink UE is synchronized with a second reference timing that is based on a non-UE synchronization source and is associated with the next periodic sidelink synchronization signal.

28. The method of claim 27, wherein the transmitting transmits the synchronization request message over a sidelink communications channel as a Medium Access Control (MAC) Command Element (CE).

29. The method of claim 27, wherein the transmitting transmits the synchronization request message as via unicast, multicast or broadcast.

30. The method of claim 27,
determining that the UE has transitioned from being synchronized with respect to a network clock to being unsynchronized with respect to the network clock,
wherein the transmitting is performed in response to the determining.

31. The method of claim 27,
determining that a quality associated with a synchronization source of the UE has dropped below a threshold,
wherein the transmitting is performed in response to the determining.

32. A method of operating a user equipment (UE), comprising:
receiving a synchronization request message from a peer sidelink UE; and
transmitting, on one or more UE-specific resources with a first reference timing that is independent of any non-UE synchronization source in advance of a next periodic sidelink synchronization signal transmitted by the UE or a network component subsequent to the reception of the synchronization request message, at least one sidelink synchronization signal to the peer sidelink UE in response to the synchronization request message, wherein the UE is synchronized with a second reference timing that is based on a non-UE synchronization source and is associated with the next periodic sidelink synchronization signal.

33. The method of claim 32, wherein the receiving receives the synchronization request message over a sidelink communications channel as a Medium Access Control (MAC) Command Element (CE).

34. The method of claim 32, wherein the receiving receives the synchronization request message as via unicast, multicast or broadcast.

35. A user equipment (UE), comprising:
means for identifying a pool of resources where transmission of sidelink synchronization signals is permitted, the pool of resources comprising at least UE-specific resources with a first reference timing that is independent of any non-UE synchronization source, wherein the UE is synchronized with a second reference timing that is based on a non-UE synchronization source; and
means for transmitting a sidelink synchronization signal to one or more peer sidelink UEs based on a subset of the pool of resources.

36. A user equipment (UE), comprising:
means for receiving a sidelink synchronization signal from a peer sidelink UE based on a subset of a pool of resources where transmission of sidelink synchronization signals is permitted, the pool of resources comprising at least UE-specific resources with a first reference timing that is independent of any non-UE synchronization source, wherein the peer sidelink UE is synchronized with a second reference timing that is based on a non-UE synchronization source; and
means for synchronizing a clock at the UE based at least in part upon the sidelink synchronization signal.

37. A user equipment (UE), comprising:
means for transmitting a synchronization request message to at least one peer sidelink UE; and
means for receiving, on one or more UE-specific resources with a first reference timing that is independent of any non-UE synchronization source in advance of a next periodic sidelink synchronization signal that is received at the UE subsequent to the transmission of the synchronization request message, at least one sidelink synchronization signal from the at least one peer sidelink UE in response to the transmitting, wherein the at least one peer sidelink UE is synchronized with a second reference timing that is based on a non-UE synchronization source and is associated with the next periodic sidelink synchronization signal.

38. A user equipment (UE), comprising:
means for receiving a synchronization request message from a peer sidelink UE; and
means for transmitting, on one or more UE-specific resources with a first reference timing that is independent of any non-UE synchronization source in advance of a next periodic sidelink synchronization signal transmitted by the UE or a network component subsequent to the reception of the synchronization request message, at least one sidelink synchronization signal to the peer sidelink UE in response to the synchronization request message, wherein the UE is synchronized with a second reference timing that is based on a non-UE synchronization source and is associated with the next periodic sidelink synchronization signal.

39. A user equipment (UE), comprising:
a memory;
at least one transceiver; and
at least one processor coupled to the memory and the at least one transceiver and the at least one processor configured to:
identify a pool of resources where transmission of sidelink synchronization signals is permitted, the pool of resources comprising at least UE-specific resources with a first reference timing that is independent of any non-UE synchronization source, wherein the UE is synchronized with a second reference timing that is based on a non-UE synchronization source; and
transmit, via the at least one transceiver, a sidelink synchronization signal to one or more peer sidelink UEs based on a subset of the pool of resources.

40. A user equipment (UE), comprising:
a memory;
at least one transceiver; and
at least one processor coupled to the memory and the at least one transceiver and the at least one processor configured to:
receive a sidelink synchronization signal from a peer sidelink UE based on a subset of a pool of resources where transmission of sidelink synchronization signals is permitted, the pool of resources comprising at least UE-specific resources with a first reference timing that is independent of any non-UE synchronization source, wherein the peer sidelink UE is synchronized with a second reference timing that is based on a non-UE synchronization source; and
synchronize a clock at the UE based at least in part upon the sidelink synchronization signal.

41. A user equipment (UE), comprising:
a memory;
at least one transceiver; and
at least one processor coupled to the memory and the at least one transceiver and the at least one processor configured to:
transmit, via the at least one transceiver, a synchronization request message to at least one peer sidelink UE; and
receive, on one or more UE-specific resources with a first reference timing that is independent of any non-UE synchronization source in advance of a next periodic sidelink synchronization signal that is received at the UE subsequent to the transmission of the synchronization request message, at least one sidelink synchronization signal from the at least one peer sidelink UE in response to the transmitting, wherein the at least one peer sidelink UE is synchronized with a second reference timing that is based on a non-UE synchronization source and is associated with the next periodic sidelink synchronization signal.

42. A user equipment (UE), comprising:
a memory;
at least one transceiver; and
at least one processor coupled to the memory and the at least one transceiver and the at least one processor configured to:
receive a synchronization request message from a peer sidelink UE; and
transmit, on one or more UE-specific resources with a first reference timing that is independent of any non-UE synchronization source in advance of a next periodic sidelink synchronization signal transmitted by the UE or a network component subsequent to the reception of the synchronization request message, at least one sidelink synchronization signal to the peer sidelink UE in response to the synchronization request message, wherein the UE is synchronized with a second reference timing that is based on a non-UE synchronization source and is associated with the next periodic sidelink synchronization signal.

43. A non-transitory computer-readable medium containing instructions stored thereon, which, when executed by a user equipment (UE), cause the UE to perform actions, the instructions comprising:
- at least one instruction configured to cause the UE to identify a pool of resources where transmission of sidelink synchronization signals is permitted, the pool of resources comprising at least UE-specific resources with a first reference timing that is independent of any non-UE synchronization source, wherein the UE is synchronized with a second reference timing that is based on a non-UE synchronization source; and
- at least one instruction configured to cause the UE to transmit a sidelink synchronization signal to one or more peer sidelink UEs based on a subset of the pool of resources.

44. A non-transitory computer-readable medium containing instructions stored thereon, which, when executed by a user equipment (UE), cause the UE to perform actions, the instructions comprising:
- at least one instruction configured to cause the UE to receive a sidelink synchronization signal from a peer sidelink UE based on a subset of a pool of resources where transmission of sidelink synchronization signals is permitted, the pool of resources comprising at least UE-specific resources with a first reference timing that is independent of any non-UE synchronization source, wherein the peer sidelink UE is synchronized with a second reference timing that is based on a non-UE synchronization source; and
- at least one instruction configured to cause the UE to synchronize a clock at the UE based at least in part upon the sidelink synchronization signal.

45. A non-transitory computer-readable medium containing instructions stored thereon, which, when executed by a user equipment (UE), cause the UE to perform actions, the instructions comprising:
- at least one instruction configured to cause the UE to transmit a synchronization request message to at least one peer sidelink UE; and
- at least one instruction configured to cause the UE to receive, on one or more UE-specific resources with a first reference timing that is independent of any non-UE synchronization source in advance of a next periodic sidelink synchronization signal that is received at the UE subsequent to the transmission of the synchronization request message, at least one sidelink synchronization signal from the at least one peer sidelink UE in response to the transmitting, wherein the at least one peer sidelink UE is synchronized with a second reference timing that is based on a non-UE synchronization source and is associated with the next periodic sidelink synchronization signal.

46. A non-transitory computer-readable medium containing instructions stored thereon, which, when executed by a user equipment (UE), cause the UE to perform actions, the instructions comprising:
- at least one instruction configured to cause the UE to receive a synchronization request message from a peer sidelink UE; and
- at least one instruction configured to cause the UE to transmit, on one or more UE-specific resources with a first reference timing that is independent of any non-UE synchronization source in advance of a next periodic sidelink synchronization signal transmitted by the UE or a network component subsequent to the reception of the synchronization request message, at least one sidelink synchronization signal to the peer sidelink UE in response to the synchronization request message, wherein the UE is synchronized with a second reference timing that is based on a non-UE synchronization source and is associated with the next periodic sidelink synchronization signal.

* * * * *